US010690636B2

(12) United States Patent
Ruppel et al.

(10) Patent No.: US 10,690,636 B2
(45) Date of Patent: Jun. 23, 2020

(54) TRAPS FOR USE WITH CHROMATOGRAPHY SYSTEMS

(71) Applicant: PERKINELMER HEALTH SCIENCES, INC., Waltham, MA (US)

(72) Inventors: Timothy Ruppel, Sugar Grove, IL (US); Brett Boyer, Independence, KY (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 607 days.

(21) Appl. No.: 14/877,315

(22) Filed: Oct. 7, 2015

(65) Prior Publication Data
US 2016/0139091 A1 May 19, 2016

Related U.S. Application Data

(60) Provisional application No. 62/061,408, filed on Oct. 8, 2014, provisional application No. 62/087,527, filed on Dec. 4, 2014.

(51) Int. Cl.
G01N 33/00 (2006.01)
G01N 30/16 (2006.01)
G01N 30/14 (2006.01)
G01N 30/02 (2006.01)

(52) U.S. Cl.
CPC ............ *G01N 30/16* (2013.01); *G01N 30/14* (2013.01); *G01N 2030/025* (2013.01)

(58) Field of Classification Search
CPC ... G01N 30/14; G01N 30/16; G01N 2030/025
See application file for complete search history.

(56) References Cited

U.S. PATENT DOCUMENTS

| 3,176,501 | A | * | 4/1965 | Briggs | G01N 1/40 55/329 |
| 4,426,879 | A | * | 1/1984 | Humphries | G01N 13/00 73/60.11 |
| 4,756,725 | A | * | 7/1988 | Badey | G01N 30/80 422/430 |
| 4,919,892 | A | * | 4/1990 | Plumb | G01N 33/1833 422/408 |
| 9,618,427 | B2 | * | 4/2017 | Theron | G01N 1/10 |
| 2004/0154414 | A1 | * | 8/2004 | LaCourse | G01N 1/2294 73/863.23 |
| 2012/0252709 | A1 | * | 10/2012 | Felts | A61M 5/3129 508/100 |
| 2013/0139568 | A1 | * | 6/2013 | Guieze | G01N 30/08 73/23.41 |

* cited by examiner

Primary Examiner — Blake A Tankersley
(74) Attorney, Agent, or Firm — Rhodes IP PLC; Christopher R Rhodes

(57) ABSTRACT

Certain configurations are provided herein of a trap that can be used with chromatography systems. In certain instances, the trap may be designed to remove substantially all oil in a sample comprising the oil and an analyte of interest. Methods using the gravity trap are also described.

17 Claims, 7 Drawing Sheets

TRAPS FOR USE WITH CHROMATOGRAPHY SYSTEMS

PRIORITY APPLICATION

This application is related to and claims priority to each of U.S. Provisional Application No. 62/061,408 filed on Oct. 8, 2014 and to U.S. Provisional Application No. 62/087,527 filed on Dec. 4, 2014, the entire disclosure of each of which is hereby incorporated herein by reference for all purposes.

TECHNOLOGICAL FIELD

This application is related to traps for use with chromatography systems. In some instances, the trap can be configured as a gravity trap to remove oil in a sample while permitting continued flow of vaporized analyte to waste or other components of the system.

BACKGROUND

Chromatography systems can be used to separate and analyze many different samples. In some instances, there may be one or more components in the sample that can interfere with analysis of other components in the sample or can cause damage to instrument components.

SUMMARY

In one aspect, a chromatography system comprising an injector comprising an inlet port fluidically coupled to a first outlet and a second outlet, in which the injector is configured to receive a fluid sample comprising an oil and analyte of interest through the inlet port, vaporize the received fluid sample and provide the vaporized fluid sample through the first and second outlets is provided. In certain embodiments, a trap is fluidically coupled to the first outlet of the injector through a fluid line fluidically coupled to the first outlet. In some configurations, the trap is configured to receive oil in the fluid sample and trap the oil in the fluid sample while permitting continued flow of vaporized analyte of interest in the vaporized fluid (in the trap) to waste or other components of the system.

In certain examples, the trap is configured as a gravity trap constructed and arranged to receive oil in the sample and retain the received oil. In some examples, the fluid line penetrates into the trap to permit dripping of oil from the fluid line and into the trap. In other examples, a terminal section of the fluid line that penetrates into the trap is positioned at a lower height than a height of the input port of the injector. In some embodiments, the system may comprise a visual indicator material in the trap, in which the visual indicator material is effective to permit viewing of condensed oil in the trap. In other examples, the trap further comprises a drain valve configured to permit removal of the condensed oil from the trap. In certain embodiments, the injector is positioned in an internal space of an instrument housing, and the trap is positioned inside of the instrument housing. In some embodiments, the injector is positioned in an internal space of an instrument housing, the trap is positioned outside of the instrument housing, and the fluid line travels from the internal space to the outside of the instrument housing. In other instances, the system comprises an oven configured to receive a chromatography column that fluidically couples to the second outlet to receive the vaporized analyte of interest. In certain examples, the system comprises a detector fluidically coupled to the chromatography column. In certain embodiments, the injector is configured as a split port injector. In other embodiments, the system comprises at least one flow controller fluidically coupled to the injector. In some examples, the trap comprises at least one material effective to absorb the oil. In further instances, a trap fluid line comprises a larger inner diameter than an outer diameter of the fluid line. In some embodiments, a first section of the fluid line fluidically coupling the first outlet of the injector to the trap is positioned within an instrument housing comprising the injector and a second section of the fluid line fluidically coupling the first outlet of the injector to the trap is positioned outside of the instrument housing comprising the injector. In some embodiments, a fluid line that fluidically couples the first outlet of the injector and the trap comprises a bifurcated path comprising the first outlet and the second outlet, in which a first path of the bifurcated path is positioned within a housing of the trap and a second path of the bifurcated path is configured to fluidically couple to a chromatography column. In some examples, the system comprises a detector fluidically coupled to the second path of the bifurcated path. In other examples, the detector is selected from the group consisting of a mass spectrometer, a thermal conductivity detector, a flame ionization detector, a flame photometric detector, a photoionization detector, an infrared detector, a catalytic combustion detector, a discharge ionization detector, an electron capture detector, a thermionic detector and a nitrogen-phosphorous detector. In some configurations, the system comprises a flow controller configured to control the flow of carrier gas in the chromatography system. In other configurations, the system comprises a processor electrically coupled to the flow controller.

In another aspect, a trap configured to remove oil in a fluid sample to be analyzed using a gas chromatography system is provided. In some instances, the trap comprises a coupler configured to fluidically couple to a fluid line fluidically coupled to an injector, a split fluid path fluidically coupled to the coupler, the split fluid path comprising an inlet, a first outlet and a second outlet, the split fluid path configured to receive sample provided to the coupler through the inlet of the split fluid path and to split the received sample into a first flow provided to the first outlet and to a second flow provided to the second outlet, and a trap fluid line fluidically coupled to the first outlet of the split fluid flow path and configured to condense oil in the fluid sample received through the first outlet and configured to permit continued flow of vaporized analyte of interest in the fluid sample to waste or other components.

In some examples, the coupler is configured to permit penetration of the fluid line into the coupler. In other examples, the penetrated fluid line terminates within the first outlet. In some embodiments, the trap fluid line is fluidically coupled to a drain valve. In further examples, the trap is effective to remove substantially all oil in the fluid sample without the use of any material effective to absorb the oil. In some embodiments, the trap is effective to remove substantially all oil in the fluid sample without the use of any charcoal in the trap. In some configurations, the split fluid flow path comprises glass tubing. In other configurations, the split fluid flow path comprises an optically transparent window to permit visualization of oil in the split fluid flow path. In certain embodiments, the trap fluid line comprises an optically transparent window to permit visualization of oil in the split fluid flow path. In other examples, the split fluid flow path is integral to the coupler.

In an additional aspect, a gas chromatography system configured to receive a fluid sample comprising an oil and an analyte of interest through an injector and provide at least a portion of the fluid sample to a chromatography column fluidically coupled to the injector is disclosed. In certain instances, the gas chromatography system comprises a housing configured to receive the chromatography column and sized and arranged to position the chromatography column within the housing. The gas chromatography system may also comprise a trap positioned external to the housing and configured to fluidically couple to the injector through a first fluid line and to the chromatography column through a second fluid line, the trap configured to receive and retain the oil in the fluid sample received through the first fluid line.

In certain embodiments, the fluid line penetrates into the trap so the oil received by the trap drips into a trap fluid line. In some embodiments, the trap fluid line comprises a drain valve. In certain examples, a height of some portion of the trap fluid line, e.g., the drain valve, is lower than a height of the injector. In other examples, the trap fluid line comprises at least one material effective to absorb the oil. In some embodiments, the system comprises a split flow injector in the housing, in which one outlet of the split flow injector is fluidically coupled to the trap through the fluid line. In certain examples, the system comprises a detector positioned within the housing. In other embodiments, the system comprises an oven within the housing, the oven configured to receive the chromatography column. In some examples, the system comprises a backflush device fluidically coupled to the chromatography column. In certain configurations, the trap is configured to receive and retain the oil without the use of any charcoal.

In another aspect, a method comprising vaporizing a sample comprising analyte of interest and an oil by injecting the sample into a chromatography system comprising a split flow injector and a gravity trap fluidically coupled to a first outlet of the split flow injector through a fluid line, removing oil from the sample received the gravity trap, providing vaporized analyte of interest (in the gravity trap), that is substantially free of any oil, to waste, and detecting at least one separated analyte component in the analyte of interest by providing a flow of sample through a second outlet of the injector to a column and a detector is described.

In certain examples, the method comprises positioning a first section of the fluid line, that fluidically couples the gravity trap to the injector, inside an instrument housing comprising the injector, positioning a second section of the fluid line outside of the instrument housing, and positioning at least some portion of the gravity trap outside of the instrument housing. In other examples, the method comprises selecting the oil of the injected sample to comprise motor oil from a fuel engine and detecting at least one fuel component as the separated analyte. In some embodiments, the method comprises selecting the oil of the injected sample to comprise a plant oil or an edible oil. In further examples, the gravity condensing step comprises positioning a terminal portion of the fluid line within the gravity trap. In certain instances, the method comprises positioning the entire gravity trap outside of an instrument housing comprising the injector. In other instances, the method comprises positioning the terminal portion of the fluid line at a height lower than a height of the injector. In some examples, the method comprises positioning a visual indicator material in the gravity trap, in which the visual indicator material is effective to permit viewing of condensed oil in the gravity trap. In further examples, the method comprises draining condensed oil from the gravity trap. In some embodiments, the method comprises configuring the gravity trap to permit continued flow of vaporized analyte of interest in a housing of the gravity trap back to waste or to other components of the system.

In an additional aspect, a method of analyzing a sample comprising analyte of interest and an oil using a gas chromatography system is disclosed. In certain configurations, the method comprises providing a gravity trap configured to fluidically couple to an injector of the gas chromatography system through a fluid line that fluidically couples an outlet of the injector and an inlet of the gravity trap, and providing instructions for using the gravity trap to remove substantially all of the oil from the sample to permit substantially oil free analyte of interest to be provided to waste or other components of the system.

In certain embodiments, the method comprises configuring the gravity trap with a trap fluid line configured to receive the fluid line and configuring the gravity trap with a drain valve coupled to the trap fluid line to permit removal of condensed oil in the trap fluid line. In other embodiments, the method comprises providing the chromatography column. In some examples, the method comprises providing a detector configured to detect at least one of the separated analyte components. In certain configurations, the method comprises providing instructions for removing any existing charcoal trap present in the chromatography system and fluidically coupled to the injector. In some instances, the method comprises configuring the gravity trap with a removable reservoir configured to receive condensed oil. In additional embodiments, the method comprises configuring the gravity trap with a visual indicator material effective to provide a visual indication of when condensed oil is present in the gravity trap. In further examples, the method comprises configuring the gravity trap to be operative without the use of a vacuum. In some embodiments, the method comprises configuring the injector to be a split flow injector. In other embodiments, the method comprises selecting the sample to comprise an engine fluid comprising fuel contaminants as the analyte of interest.

In another aspect, a kit comprising a trap comprising a coupler configured to fluidically couple to a fluid line fluidically coupled to an injector of a gas chromatography system, the trap configured to receive sample provided to the coupler, and the trap comprising a fluid line fluidically coupled to a first outlet of the injector and configured to trap liquid oil in the fluid sample and configured to permit continued flow of vaporized analyte of interest in the fluid sample to waste (or to other components of the system), and instructions for using the trap to analyze a contaminant in an oil sample is provided.

In some configurations, the kit may comprise a drain valve configured to fluidically couple to the fluid line of the trap. In certain instances, the kit comprises a material effective to absorb the oil. In other examples, the kit comprises one or more of an injector, a chromatography column, tubing, a ferrule, a tee, a union and a nut. In some instances, the kit may comprise all of tubing, a ferrule, a tee and a union.

Other aspects, embodiments, examples and configurations are described in more detail herein.

BRIEF DESCRIPTION OF THE SEVERAL VIEWS OF THE DRAWINGS

Certain specific aspects, embodiments and configurations are described with reference to the accompanying figures in which.

Figure 1:
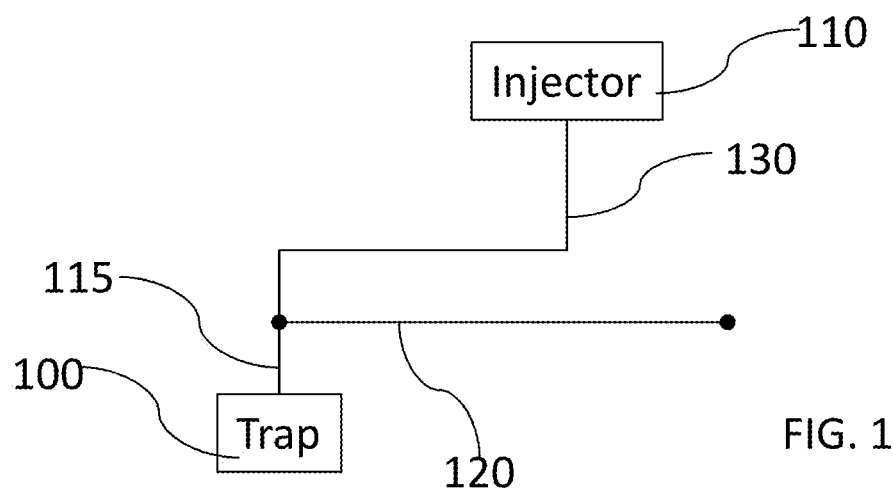
FIG. 1 is an block diagram showing an injector fluidically coupled to a trap, in accordance with certain examples.

It will be recognized by the person of ordinary skill in the art, given the benefit of this disclosure, that the particular shapes and dimensions in the figures are provided for illustration purposes only. The size of one component relative to another component is not intended to be required or limiting, and various sizes and shapes are provided merely for illustration. Many different types of components, fluid lines, fittings, ferrules, columns and the like may be used in the systems and methods described herein.

DETAILED DESCRIPTION

Certain configurations of systems, devices and methods are described herein that use a trap to remove (to at least some degree) one or more components in a sample. In some instances, the trap can be designed to remove a single component, whereas in other instances the trap can be designed to remove multiple components in the sample. While the trap may remove one or more components in the sample, the removed component(s) need not be removed from the system during operation. Instead, the trap may comprise a fluid line or reservoir that can store or house the removed component(s) until it is desirable to remove it. In other instances, the removed component can be removed from the system between sample runs or may be removed periodically or continuously during sample runs. While various embodiments are described herein in reference to contaminants present in an oil sample, the systems, devices and methods described herein can be used to analyze fluid samples other than oil samples.

In certain embodiments, the systems described herein can be used in chromatography systems that can separate two or more components in a sample. In some instances, the chromatography system may be configured as a gas chromatography system that vaporizes the sample (to at least some degree) and separates the vaporized components in the sample. In certain examples, the samples used with the systems described herein may comprise an analyte of interest and another component to be removed using the trap. In some instances, the analyte of interest may be a contaminate in an oil sample, e.g., motor oil, plant oils, mineral oils, food oils, etc. For example, the analyte of interest may be fuel or diesel present in motor oil. In other instances, the analyte of interest may be a contaminant present in a plant oil, food oil, etc. used in the food industry. As described in more detail below, the amount of the contaminant present in the oil can be used for various purposes, e.g., to monitor the condition of the oil, the purity of the oil or for other reasons.

In some configurations of the systems described herein, the oil component can be trapped/removed from the analyte in an injected sample to prevent contamination of the pneumatic pressure control (PPC) modules present in the system. For example, in conventional gas chromatography systems, a charcoal trap that absorbs vaporized oil is present between the injector and the head pressure PPC module to prevent any oil from entering into the PPC module. The presence of this charcoal trap can result in trap saturation as vaporized oil in the sample becomes absorbed by the charcoal trap. Periodic maintenance is required to ensure the charcoal trap functions properly. Otherwise, oil can reach and destroy the PPC module.

In certain configurations described herein, the charcoal trap between the PPC module and the injector can be removed or otherwise omitted, e.g., the system can be operated without the presence of any charcoal trap. The presence of a gravity trap permits any oil in the sample to condense into the gravity trap and never reach the PPC module. For example, the charcoal trap typically present can be removed and replaced with the gravity trap. Sample injected into the injector can be vaporized, and the oil can be trapped by the gravity trap while permitting the analyte(s) of interest, e.g., fuel or diesel in motor oil, to pass to a vent or waste or to another component of the system coupled to the trap. In some instances, a split injector is used where a small portion of the injected sample is provided to a chromatography column for analysis, and the remainder of the injected sample is provided to the gravity trap. The gravity trap can be used to condense the oil in the sample, and the vaporized analyte in the sample that enters into the gravity trap can be provided to the vent or waste or to another component of the system coupled to the trap.

In certain examples and referring to FIG. 1, a simplified illustration of the gravity trap is shown. The trap 100 is fluidically coupled to an injector 110 through a first fluid line 115 fluidically coupled to the injector 110, e.g., through a first outlet of the injector 110. A second fluid line 120 can be fluidically coupled to the injector e.g., through a second outlet of the injector 110, and can be fluidically coupled to a chromatography column (not shown). The exact positioning of the two fluid lines relative to the injector 110 may vary. In some embodiments, the vaporized oil and the vaporized analyte exit the injector 110 together through a common fluid line 130 and then encounter the two fluid lines 115, 120. The first fluid line 115 may be fluidically coupled to the gravity trap 100 to permit vaporized oil in the sample to condense within the trap 100. Vaporized analyte of interest may continue its flow through the second fluid line 120 and onto a chromatography column (not shown) fluidically coupled to the second fluid line 120.

In some embodiments, the gravity trap 100 can be present at a lower temperature to permit the vaporized oil to condense in the trap 100. For example, the temperature of the trap 100 can be selected such that it is above the vaporization temperature of the analyte of interest but below the vaporization temperature of the oil. When the vaporized oil encounters the trap, the oil condenses and is collected by the trap. Vaporized analyte that enters into the gravity trap may continue its flow to a vent or waste line or to another component. In some configurations, the trap (or some portion thereof) can be positioned external to the instrument housing to provide a desired temperature difference between the injector (or the oven) and the trap, whereas in other instances the trap can be positioned within an instrument housing. While the exact temperature difference can vary from sample to sample, the temperature of the trap is desirably below the vaporization temperature of the oil to promote condensation of the oil and/or to retain the oil in a liquid state. In some embodiments, the trap may comprise a fluid line or reservoir positioned outside of the instrument housing. The fluid line or reservoir can be sized and arranged to collect oil dripping into it and may comprise one or more drain ports to remove the oil if desired. The exact volume of the trap fluid line or reservoir may vary, and in some instances the trap fluid line or reservoir may comprise a volume of one or two milliliters to about 100 milliliters. A typical injection volume comprises about 0.1 microliters of oil per injection, and by sizing the trap fluid line to be about one milliliter the trap fluid line can hold oil for over 10,000 injections. If desired, the trap fluid line can be sized to be about two mL, three, mL, four mL or five mL. By selecting the size of the trap fluid line to be larger, the trap fluid line may retain more oil and can be emptied at a reduced frequency. In some configurations, the trap fluid line or reservoir may be clear or may include a visual indicator so that a user can view the presence of oil in the trap fluid line or reservoir and can determine if the trap fluid line needs to be emptied or not. Where the trap is positioned within the instrument housing, a window or looking glass can be present to permit a user to view whether or not the trap needs to be emptied.

Figure 2:
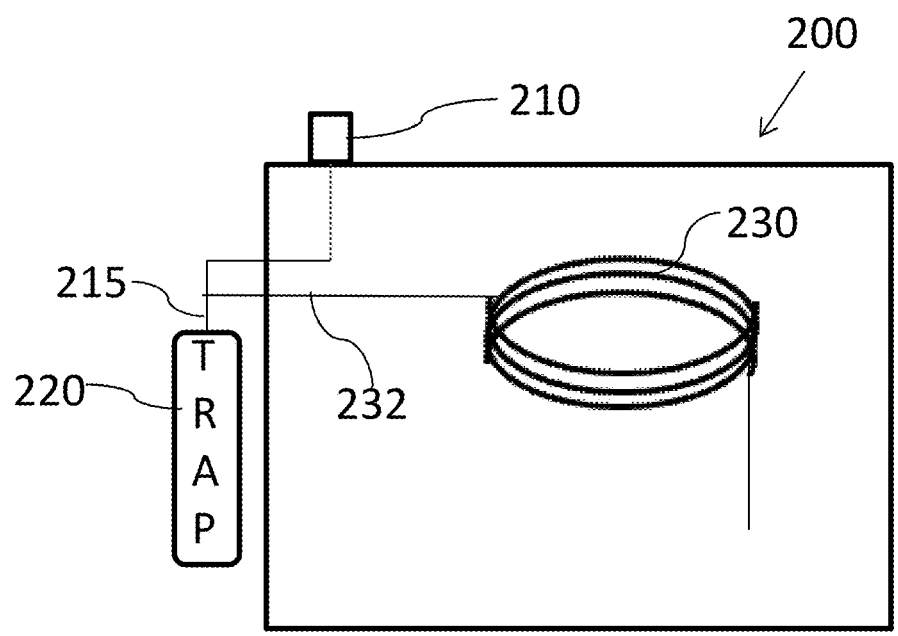
FIG. 2 is an illustration of a chromatography system comprising a housing and a trap positioned external to the housing, in accordance with certain examples.

In other instances, the trap 100 may be positioned at a lower height than the height of the injector 110 to permit condensed oil to drip down into the trap 100 for collection, e.g., to use gravity to permit dripping of the oil and/or collection of the oil. For example, the fluid line of the trap 100 can be positioned at a lower height than an outlet port of the injector so that condensed oil will drip down into the trap fluid line under gravitational forces. In some instances, the trap fluid line reservoir can be positioned substantially vertical with respect to gravity. Referring to FIG. 2 a side view of an instrument 200 is shown that comprises an injector 210, a trap 220 fluidically coupled to the injector 210 and a column 230 fluidically coupled to the injector 210. The injector 210 can be configured to split the flow of the injected sample so some portion of the sample is provided to a chromatography column and the remainder of the sample is provided to the trap 220. Trapping of the oil by the trap 220 also permits some analyte of interest in the sample to be provided from the injector 210 to the column 230 through a fluid line 232. The column 230 is typically present in an oven to maintain the analyte of interest in the gas phase. If desired, fluid line 232 may be entirely within an oven to maintain the analyte/oil in the vapor phase prior to it being provided to the column 230. The trap 220 is shown as being positioned outside of the housing of the instrument 200. A vertical fluid line 215 fluidically couples the trap 220 to the injector 210 and assists in collection of any oil as the oil drips into the trap 220 under the force of gravity. The trap 220 may be passive in that it does not trap the oil using any active materials, e.g., charcoal, beads, sieves, etc., though one or more active materials may also be present in the trap if desired. The trap 220 may comprise a valve (not shown) to permit a user to drain the collected oil from the trap at a desired interval. For example, opening of the valve in combination with pressure in the system can result in the oil being forced from the trap 220. The oil can be collected for recycling or otherwise disposed of. If desired, the trap 220 may comprise one or more electronically actuated valves that can open at a desired interval (or when the trap is full) to empty the trap automatically. While not shown, the trap 220 is typically fluidically coupled to a vent or waste to permit non-oil vaporized components in the gravity trap to pass to a vent or to waste.

Figure 3:
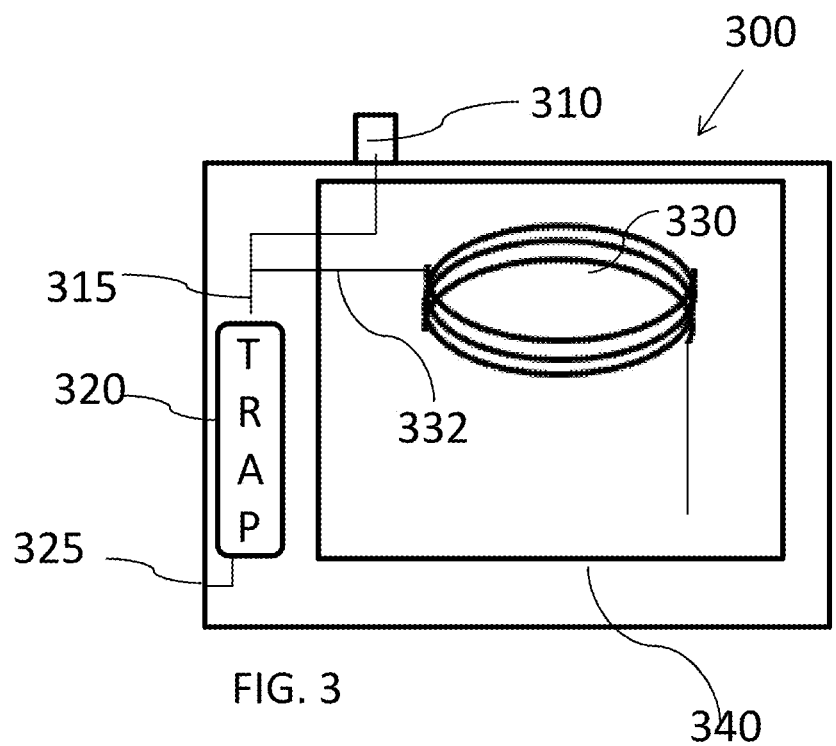
FIG. 3 is an illustration of a chromatography system comprising a housing and a trap positioned within the housing, in accordance with certain examples.

In some configurations, the trap can be positioned inside of an instrument housing. Referring to FIG. 3, a system 300 is shown that comprises an injector 310, a trap 320 fluidically coupled to the injector 310 and a column 330 fluidically coupled to the injector 310. The injector 310 can be configured to split the flow of the injected sample. Trapping of the oil in the trap 320 permits removal of the oil from the system 300 so it does not contaminate any pneumatic controllers. As shown in FIG. 3, the flow is split into a fluid line 315 and a fluid line 332. The fluid line 332 is fluidically coupled to a column 330, which is typically present in an oven 340 to maintain the analyte of interest in the gas phase. The trap 320 is shown as being positioned inside of the housing of the instrument 300. A vertical fluid line 315 fluidically couples the trap 320 to the injector 310 and assists in collection of any oil as the oil drips into the trap 320 under the force of gravity. The trap 320 may be passive in that it does not trap the oil using any active materials, e.g., charcoal, beads, sieves, etc., though one or more active materials may also be present in the trap if desired. The trap 320 may comprise a valve and/or fluid line 325 to permit a user to drain the collected oil from the trap at a desired interval. For example, opening of the valve in combination with pressure in the system can result in the oil being forced from the trap 320 and outside of the instrument 300. A drain port (not shown) may be present on the instrument housing to permit a user to drain the oil from the trap 320 without opening the instrument housing. The oil can be collected for recycling or otherwise disposed of. If desired, the trap 320 may comprise one or more electronically actuated valves that can open at a desired interval (or when the trap is full) to empty the trap automatically. In some configurations, a looking glass or window may be present in the instrument housing to permit a user to view the trap 320 within the instrument 300. Where the trap 320 is positioned inside the instrument housing, the trap 320 is desirably outside of the oven 340 to permit the collected oil to remain in the liquid phase. If desired, the trap may be air cooled or its temperature regulated by air or the trap may be temperature controlled. Contaminants in the sample may be provided to a vent or waste that is fluidically coupled to the trap 320.

Figure 4:
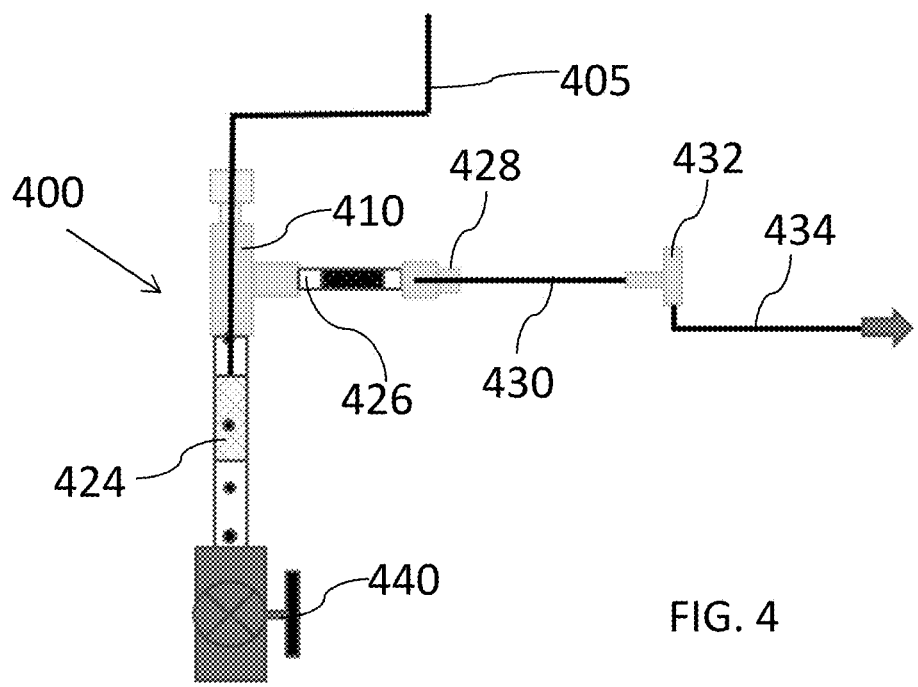
FIG. 4 is an illustration of a trap, in accordance with certain configurations.

In some embodiments, the trap used herein may comprise suitable fittings and components to provide a fluid tight coupling to the injector (or fluid line coupled to the injector) to receive oil in the sample injected. While many different configurations are possible, one configuration of a trap is shown in FIG. 4. The trap 400 comprises a coupler 410 configured to fluidically couple to an outlet port or an outlet fluid line 405 of the injector (not shown) to receive oil in the injected sample. The coupler 410 can be configured to provide (or coupled to another component that provides) a split path such that vaporized analyte in the sample may continue to flow onto a vent. For example, the coupler 410 may comprise a ferrule and tee assembly that can fluidically couple two or more fluid paths to each other. In one configuration, the coupler 410 couples to a trap fluid line 424 and to a second fluid line 426. Vaporized sample, e.g., sample from a split flow injector, comprising oil and analyte of interest may enter into the trap 400 through the fluid line 405 and enter into the trap fluid line 424. The oil condenses into the trap fluid line 424, and any vaporized analyte of interest that enters into the trap fluid line 424 can flow back into the coupler 410 and into the second fluid line 426. If desired, the second fluid line 426 may comprise glass wool or other materials to prevent any uncondensed oil from being provided downstream of the fluid line 426. The fluid line 426 can fluidically couple to another fluid line 430 through a union 428. The fluid line 430 may fluidically couple to a tee 432, which itself can be fluidically coupled to a vent or waste (not shown) through a fluid line 434. The trap fluid line reservoir 424 may comprise a valve 440 or other actuation device, e.g., manually or electronically actuated device, that can permit removal of the condensed oil collected in the fluid trap line 424.

In one configuration, the trap may be assembled using ferrules, tubing, and suitable nuts or other fasteners. For example, the fluid line from the injector can penetrate into a ¼" ferrule and into the fluid line fluidically coupled to the trap fluid line. The terminal portion of the fluid line from the injector can be the site from which oil drips into the trap fluid line. ¼" tubing (or other suitably sized tubing) can be used as the trap fluid line. If desired, glass wool or other components can be present in the ¼" tubing to assist in retention of the oil in the trap fluid line or to enhance visualization of the oil appearing in the trap fluid line. The trap may be assembled using a ¼" ferrule and/or nut that is coupled to a ¼" ball valve drain through a ¼" trap fluid line. The ball valve drain can be opened and closed by an end user to remove oil from the trap fluid line. The trap can collect oil using gravitational forces, e.g., without the use of any vacuum.

In certain instances, the traps described herein may be used to analyze fuel contaminants in vehicle fluids, e.g., motor oil, transmission fluid, differential fluid, power steering fluid, brake fluid or other fluids used in vehicles such as automotive vehicles, tractors, trains, buses, heavy equipment (e.g., tractors, bulldozers, backhoes, etc.), airplanes, motorcycle engines, small bore engines (e.g., 2-stroke or 4-stroke engines) and other vehicles and devices that may use one or more fuels to power the vehicle or device. In the context of motor oil, fuel such as gasoline or diesel fuel can slowly makes its way into the motor oil. At low amounts, e.g., 4-5% or less, the fuel oil may not interfere with the operation of the engine oil. At higher amounts, lubrication and/or anti-corrosion properties of the oil can be diminished, which necessitates changing the oil to new engine oil. Rather than change the oil based on interval usage, e.g., 3 months, 3,000 miles, 1000 hours, etc., the traps described herein can be used in measurements of the level of various fuel species contaminants in the engine oil. Where the contaminate levels exceed an acceptable amount, the motor oil can be changed. Where motor oil is tested for gasoline contaminants, gasoline contaminants up to about twelve carbons, for example, can be analyzed. Where motor oil is tested for diesel contaminants, diesel contaminants up to about twenty carbons, for example, can be analyzed. Where motor oil is tested for biodiesel contaminants, biodiesel contaminants up to about twenty-one or twenty-two carbons, for example, can be analyzed.

In certain embodiments, various different types of motor oil including synthetic-semi-synthetic blends, high mileage oils and conventional oils can be analyzed for contaminants using the systems and methods described herein. Illustrative weights of motor oils that can be analyzed include, but are not limited to, 0W-20, 0W-30, 0W-40, 0W-50, 5W-20, 5W-30, 5W-40, 5W-50, 10W-30, 10W-40, 10W-50, 15W-30, 15W-40, 15W-50, 20W-50, SAE 10, SAE 30, SAE 40, SAE 60 and other motor oil weights commonly used in automotive vehicles, motorcycles, recreational vehicles, airplane engines and heavy equipment engines. Where transmission fluid is tested, various contaminants and/or breakdown products (from degradation of the transmission fluid through use, heat or age) of lower molecular weight can be analyzed. For example, contaminants in automatic transmission fluid (ATF) including ATF that meets GM-DEXRON VI, Ford MERCON LV and SP, Honda-DW1, Nissan Matic-S, Toyota WS, Allison TES-295 or C4, DEXRON III, MERCON, Voith G-1363, or ZF TE-ML 14C specifications can be tested. Similarly, contaminants in manual transmission fluid (MTF) with various weights including, but not limited to, 75W-90, 5W-30, SAE 10, SAE 30, SAE 50, etc. can also be tested. Where differential fluid is tested, various contaminants and/or breakdown products (from degradation of the differential fluid through use, heat or age) of lower molecular weight can be analyzed. For example, contaminants in differential fluid or gear lube (with various weights including, but not limited to, 75W-90, 75W-110, 75W-140, SAE 190, SAE 250, 80W-140, 80W-90, etc.) can be tested. Where power steering fluid is tested, various contaminants or breakdown products (from degradation of the power steering fluid through use, heat or age) of lower molecular weight can be analyzed. For example, contaminants in synthetic or non-synthetic power steering fluid can be analyzed. Where brake fluid is tested, various breakdown products (from degradation of the power steering fluid through use, heat or age) of lower molecular weight can be analyzed. For example, contaminants in DOT 3 or DOT 4 brake fluid can be analyzed. Where contaminants in hydraulic oil used in heavy equipment, drilling operations and the like are tested, various breakdown products (from degradation of the hydraulic fluid through use, heat or age) of lower molecular weight can be analyzed. Illustrative hydraulic fluids or oils include, but are not limited to, those meeting ISO 22, ISO 32, ISO 46, ISO 68 standards or 5W-30 or other weight oils.

In certain embodiments, the traps described herein can be used in the food science industry to analyze contaminants in edible food oils. Edible food oils include, but are not limited to, coconut oil, corn oil, cottonseed oil, olive oil, palm oil, peanut oil, rapeseed oil, safflower oil, sesame oil, soybean oil, sunflower oil, grapefruit seed oil, orange oil, lemon oil, beech oil, almond oil, cashew oil, walnut oil, pistachio oil, pine nut oil, pecan oil, mongongo nut oil, macadamia oil, hazelnut oil, cashew oil, bitter gourd oil, bottle gourd oil, watermelon seed oil, buffalo gourd oil, butternut squash seed oil, egus seel oil, pumpkin seed oil, acai oil, black seed oil, blackcurrant seed oil, borage seed oil, evening primrose oil, flaxseed oil, amaranth oil, apricot oil, apple seed oil, argan oil, avocado oil, babassu oil, ben oil, borneo tallow nut oil, chestnut oil, carob pod oil, cocoa butter, cocklebur oil, corainder seed oil, date seed oil, dika oil, false flax oil, grape seed oil, hemp oil, kapok seed oil, kenaf seed oil, lallemantia oil, mafura oil, manila oil, meadowfoam seed oil, mustard oil, niger seed oil, nutmeg butter, okra seed oil, papaya seed oil, perilla seed oil, persimmon seed oil, pequi oil, pili nut oil, pomegranate seed oil, poppyseed oil, prune kernel oil, quinoa oil, ramtil oil, rice bran oil, royle oil, sacha inchi oil, sapote oil, seje oil, shea butter, taramira oil, tea seed oil, tea tree oil, thistle oil, tigernut oil, tobacco seed oil, tomato seed oil, wheat germ oil, and vegetable oil. Other plant based oils that may also be analyzed (and may or may not be edible) include, but are not limited to, castor oil, colza oil, rice bran oil, tung oil, jojoba oil, paradise oil, milk bush oil, linseed oil, neem oil, rubber seed oil, sea buckthorn oil, carrot seed oil, and candlenut oil.

In some examples, the devices and methods described herein can also be used to analyze impurities in essential oils, which are commonly used in cosmetic products and skin care products. While many essential oils are not "oils" in the true sense, the oils are generally insoluble in water. Illustrative essential oils include, but are not limited to, agar oil, anise oil, ajwain oil, angelica root oil, asafetida oil, Balsam of Peru, basil oil, bay oil, bergamot oil, buchu oil, birch oil, camphor, cannabis oil, caraway oil, cardamom seed oil, cedarwood oil, chamomile oil, calamus root oil, cinnamon oil, citronells oil, clove leaf oil, costmary oil, cranberry seed oil, cumin oil, davana oil, cypriol, dill oil, eucalyptus oil, fennel seed oil, fenugreek oil, frankincense oil, geranium oil, ginger oil, grapefruit oil, henna oil, hickory nut oil, horseradish oil, jasmine oil, juniper berry oil, lavender oil, lemon oil, lime oil, Melissa oil, menthe arvensis, mugwort oil, mustard oil, myrrh oil, neem oil, orange oil, oregano oil, orris oil, parsley oil, perilla essential oil, pennyroyal oil, peppermint oil, pine oil, rose oil, rosehip oil, rosemary oil, rosewood oil, sage oil, sandalwood oil, savory oil, schisandra oil, spearmint oil, star anise oil, tarragon oil, tea tree oil, thyme oil, valerian oil, vetiver oil, and yarrow oil.

In certain embodiments, the traps described herein can be used in the pharmaceutical industry to analyze contaminants in oil based pharmaceutical excipients. For example, parabens, soft paraffins, waxes, white oils, castor oil, oleochemical based excipients and other hydrocarbon based excipients can be analyzed for contaminant components in the excipients. The oil component of the excipient can be collected using the traps described herein, any contaminants in the excipients can be provided to waste without oil contamination of the PPC modules of the system and the contaminants of the sample can be analyzed using other components of the system. In some embodiments, the methods and devices described herein can be used to analyze contaminants in animal oils. For example, one or more contaminants in a fish oil, lard, oleo-oil, tallow oil, liquid margarine, shortenings, stearine, spermaceti, liver oil, and other oils obtained from animals. In other embodiments, the methods and systems described herein can be used to analyze chemical reaction products in oil solvent reaction systems without the need to perform solvent exchange into a less viscous or aqueous solvent system. For example, chemical reaction products produced using oil based solvent systems can be injected directly into the systems without the need to remove the oil based solvent.

Figure 5:
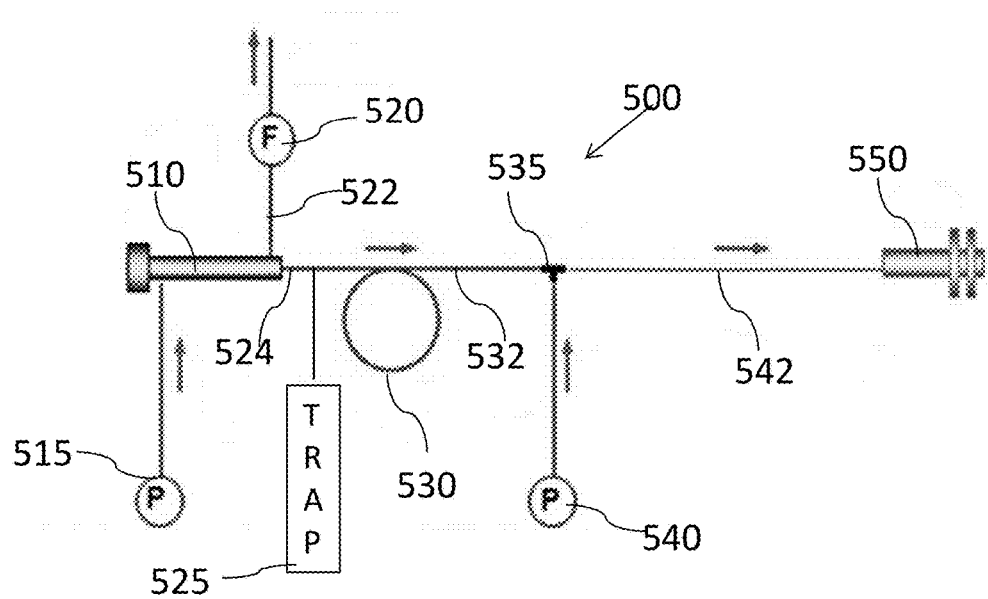
FIG. 5 is an illustration of a gas chromatography system configured for forward flow, in accordance with certain embodiments.

In certain embodiments, a system similar to that shown in FIG. 5 can be used to analyze the contaminants in the oil samples. The system 500 comprises an injector 510 fluidically coupled to a pressure source 515, e.g., a carrier gas source. A flow controller 520 may be present in the fluid line 522 to permit venting of the sample provided to the fluid line 522. A trap 525 can be coupled to the fluid line 524 and is positioned between the injector 510 and a chromatography column 530. As described herein, sample can be split with a portion provided to the trap and a portion provided to the column 530. The trap 525 is configured to trap oil in the sample and to permit vaporized contaminants (substantially free of any oil) in the sample to pass to the vent. Another pressure source 540 may fluidically couple to a fluid line 532 downstream of the column 530 through a tee 535 or other union. The tee 535 is fluidically coupled to a detector 550 through a fluid line 542, which may comprise one or more restrictors to assist in controlling the pressure in the system. In use of the system of FIG. 5, a sample is injected into the injector 510. The injector 510 can be configured as a split flow injector such that some portion of the sample injected is provided to the trap 525 and another portion of the injected sample is provided to the column 530. The injector temperature is selected to permit vaporization of substantially all of the sample including the oil component and the contaminant component. Vaporized sample in fluid line 524 encounters the trap 525, which is configured to condense and remove the oil from the vaporized sample and retain the oil in a fluid reservoir of the trap. The vaporized contaminant within the trap 525 can continue its flow to waste or a vent. The column can separate the various components in the sample and provide the separated components to the detector 550 for detection. The pressure provided by the pressure source 540 can be selected such that analyte eluting from the column is provided downstream to the detector 550. While the exact type of detector used can vary, illustrative detectors include, but are not limited to, a mass spectrometer, a thermal conductivity detector, a flame ionization detector, a flame photometric detector, a photoionization detector, an infrared detector, a catalytic combustion detector, a discharge ionization detector, an electron capture detector, a thermionic detector and a nitrogen-phosphorous detector.

Figure 6:
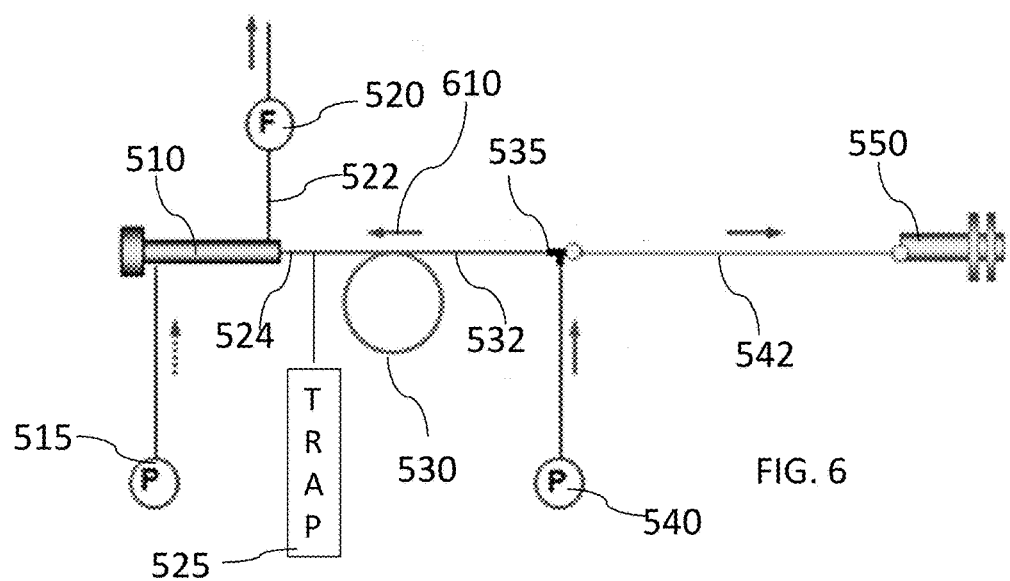
FIG. 6 is an illustration of a gas chromatography system configured for backflushing, in accordance with certain embodiments.

In some instances, the system 500 in FIG. 5 can also be used in backflushing to analyze the contaminants in the oil sample. For example and referring to FIG. 6, which generally comprises the same component as the system 500 of FIG. 5, the pressure source 540 can be used a backflush device that can provide a suitable pressure to cause sample in the fluid line 532 to flow back toward the column 530. For example, the pressure provided by the pressure source 540 may exceed that flowing out of the column 530. This configuration results in sample in the fluid line 532 flowing back toward the injector 510 in the general direction of arrow 610. For example, after certain contaminant components pass to the fluid line 542, it may be desirable to flush other components still present in the fluid line 524, the column 530 and/or the fluid line 532 back toward the injector 510 and/or trap 525 to prevent entry of those components into the detector 550 or to flush the components from the system through a vent in the fluid line 522.

In instances where fuel contaminants in motor oil are being analyzed, an injector temperature of about 350 deg. Celsius and a 15 meter×0.25 millimeter×0.25 micron methylsilicone column can be used. The pressure from the pressure source 515 can be about 310 kPa (45 psig), and the pressure from the pressure source 540 can be about 186 kPa (27 psig) where forward flow (the configuration shown in FIG. 5) is implemented. Where backflushing is used, the pressure from the pressure source 540 can be increased to about 400 kPa (58 psig), and the pressure from the pressure source 515 can be about 13.8 kPa (2 psig). A restrictor with dimensions of about 0.075 millimeters internal diameter by 137 millimeters in length can be present in the fluid line 542 for both forward flow and backflushing. If desired, flow out of the fluid line 522 can be high, e.g. 100 mL/minute, to permitting venting of sample and other components.

In some configurations, the injector 510 can be configured as a split capillary injector with a split ratio of about 100/1 for a 0.1 microliter injection (with 100 parts/units being provided to the fluid line 522 and 1 part/unit being provided to the fluid line 524). If desired, the fluid line 522 may comprise glass wool, charcoal or other selected material to trap components prior to permitting the releasing the gas into the atmosphere. Each of the pressure sources 515 and 540 may comprise a pneumatic pressure controller (PPC) to provide substantially constant gas pressure in the systems. The PPC can be electrically coupled to a processor to permit adjustment of the various flow rates provided by the PPC or manual adjustment may be performed if desired. If backflushing is desired to be used in fuel contaminant analysis, then backflushing can be implemented at various times post-injection. In one instance, backflushing can be initiated after the n-dodecane (C12) elutes (about 0.6-0.9 min elution time and where gasoline is being analyzed) as n-dodecane generally signifies the end boiling range of gasoline. Where contaminants in diesel fuel are being analyzed, after the eicosane (C20) elutes (about 1.5-2.1 min. elution time), backflushing can be initiated as eicosane generally signifies the end boiling range of diesel fuel. Where contaminants in biodiesel are being analyzed, after heneicosane (C21) elutes (about 1.8-2.4 min. elution time), backflushing can be initiated as heneicosane generally signifies the end boiling range of biodiesel fuel. Backflushing can permit other contaminants on the column to flow back from the column and into the trap 525 and/or into the fluid line 522 for venting from the system. The exact column temperature used can vary depending on the components to be analyzed, and where fuel contaminants are analyzed the column temperature can be around 225 deg. Celsius. Various carrier gases including, but not limited to, helium, hydrogen, nitrogen, argon or compressed air can be used in the system. In some instances, conditions similar to those described in ASTM D7593 dated 2013 and entitled "Standard Test Method for Determination of Fuel Dilution for In-Service Engine Oils by Gas Chromatography" can be used in the systems comprising the traps described herein.

In certain embodiments, to quantify the various contaminants in the oil species, standard curves may be constructed from known materials. For example, known materials at different concentrations can be injected into the system to provide a standard curve that may be used to determine the amount of a particular contaminant present in the oil sample. To reproduce analytical conditions, the standard injected may comprise the fuel species in oil such that similar materials are injected in both the standard runs and the sample runs. A series of standard curves can be produced for each of the contaminants to be analyzed, and the curves (or linear equations representing the curves) can be stored in a computer or processor for use in determining the level of the particular contaminants present in an oil sample. A mixture comprising numerous different standards may be used to facilitate faster production of standard curves for the various contaminants to be analyzed.

In certain instances, the systems described herein can be controlled using a processor that may control the various gas pressures, detectors and other components of the system. The processor is typically present in a computer system that is electrically coupled to the gas chromatography system through one or more boards or interfaces. A graphical user interface can be used by the user to enter or select commands, gas pressures, etc. The computer system can store the various standard curves and compare the signal response from a particular sample peak to the relevant standard curve to determine the level of a particular contaminant in the fluid sample.

In certain configurations, the systems described herein can be used in a method to analyze the contaminant components in the sample. In some instances, a sample comprising analyte of interest and an oil is vaporized by injecting the sample into a chromatography system comprising an injector and a gravity trap fluidically coupled to the injector through a fluid line. Oil is removed from the sample using the gravity trap. Vaporized analyte of interest in the trap, that is substantially free of any oil, is provided to a vent or waste. At least one analyte component in the analyte of interest can be provided to a column through split flow and can be detected using a suitable detector. In some instances, a first portion of the fluid line, that fluidically couples the gravity trap to the injector, is positioned inside an instrument housing comprising the injector, and a second portion of the fluid line is positioned outside of the instrument housing. The housing, e.g., trap fluid line and/or drain valve, of the gravity trap can be positioned outside of the instrument housing.

In some embodiments, the method may comprise selecting the oil of the injected sample to comprise motor oil from a fuel engine and at least one fuel component is detected as the separated analyte. In other instances, the fluid sample may comprise a plant oil, an edible oil or other oil based sample. In some examples, the gravity condensing step comprises positioning a terminal portion of the fluid line within the gravity trap. In other instances, the gravity trap is positioned outside of an instrument housing comprising the injector. In yet other configurations, a terminal portion of the fluid line is positioned at a height lower than a height of the injector. In some examples, the method may comprise positioning a visual indicator material in the gravity trap, in which the visual indicator material is effective to permit viewing of condensed oil in the gravity trap. In certain embodiments, the method comprises draining condensed oil from the gravity trap. In other instances, the method comprises configuring the gravity trap to permit continued flow of vaporized analyte of interest in the gravity trap to waste.

In some instances, a method of analyzing a sample comprising analyte of interest and an oil using a gas chromatography system may comprise providing a gravity trap configured to fluidically couple to an injector of the gas chromatography system through a fluid line that fluidically couples an outlet of the injector and an inlet of the gravity trap, and providing instructions for using the gravity trap to remove substantially all of the oil from the sample to permit substantially oil free analyte of interest to be provided to a vent or waste. In certain configurations, the method comprises configuring the gravity trap to receive the fluid line and configuring the gravity trap with a drain valve to permit removal of condensed oil in the gravity trap. In further instances, the method comprises providing the chromatography column. In some embodiments, the method comprises providing a detector configured to detect at least one of the separated analyte components. In certain examples, the method comprises providing instructions for removing any existing charcoal trap present in the chromatography system and fluidically coupled to the injector. In other embodiments, the method comprises configuring the gravity trap with a removable fluid reservoir configured to receive condensed oil. In certain embodiments, the method comprises configuring the gravity trap with a visual indicator material effective to provide a visual indication of when condensed oil is present in the gravity trap. In some examples, the method comprises configuring the gravity trap to be operative without the use of a vacuum. In additional embodiments, the method comprises configuring the injector to be a split flow injector. In other examples, the method comprises selecting the sample to comprise an engine fluid comprising fuel contaminants as the analyte of interest.

In certain examples, some of the various components described herein can be present in a kit to permit an end user to assemble and/or use a trap. For example, a kit may comprise a trap comprising a coupler configured to fluidically couple to a fluid line fluidically coupled to an injector of a gas chromatography system. The trap may comprise a split fluid path fluidically coupled to the coupler, the split fluid path comprising an inlet, a first outlet and a second outlet, the split fluid path configured to receive sample provided to the coupler through the inlet of the split fluid path. The trap may also comprise a fluid line fluidically coupled to the first outlet of the split fluid flow path and configured to trap liquid oil in the fluid sample received by the split fluid path and configured to permit continued flow of vaporized analyte of interest in the fluid sample in the trap to waste. Instructions for using the trap to analyze a contaminant in an oil sample may also be included in the kit. In some instances, the kit may comprise a drain valve configured to fluidically couple to the fluid line of the trap. In other instances, the kit may comprise a material effective to absorb the oil. In further examples, the kit may comprise an injector. In other instances, the kit may comprise a chromatography column. In further embodiments, the kit may comprise tubing. In additional instances, the kit may comprise one or more (or all of) a ferrule, a tee, a union, tubing and other components. The various components of the kits can be sized and arranged to permit assembly and/or use of a trap as described herein.

Certain specific examples are described below to illustrate further some of the novel aspects and configurations described herein.

Example 1

Figure 7:
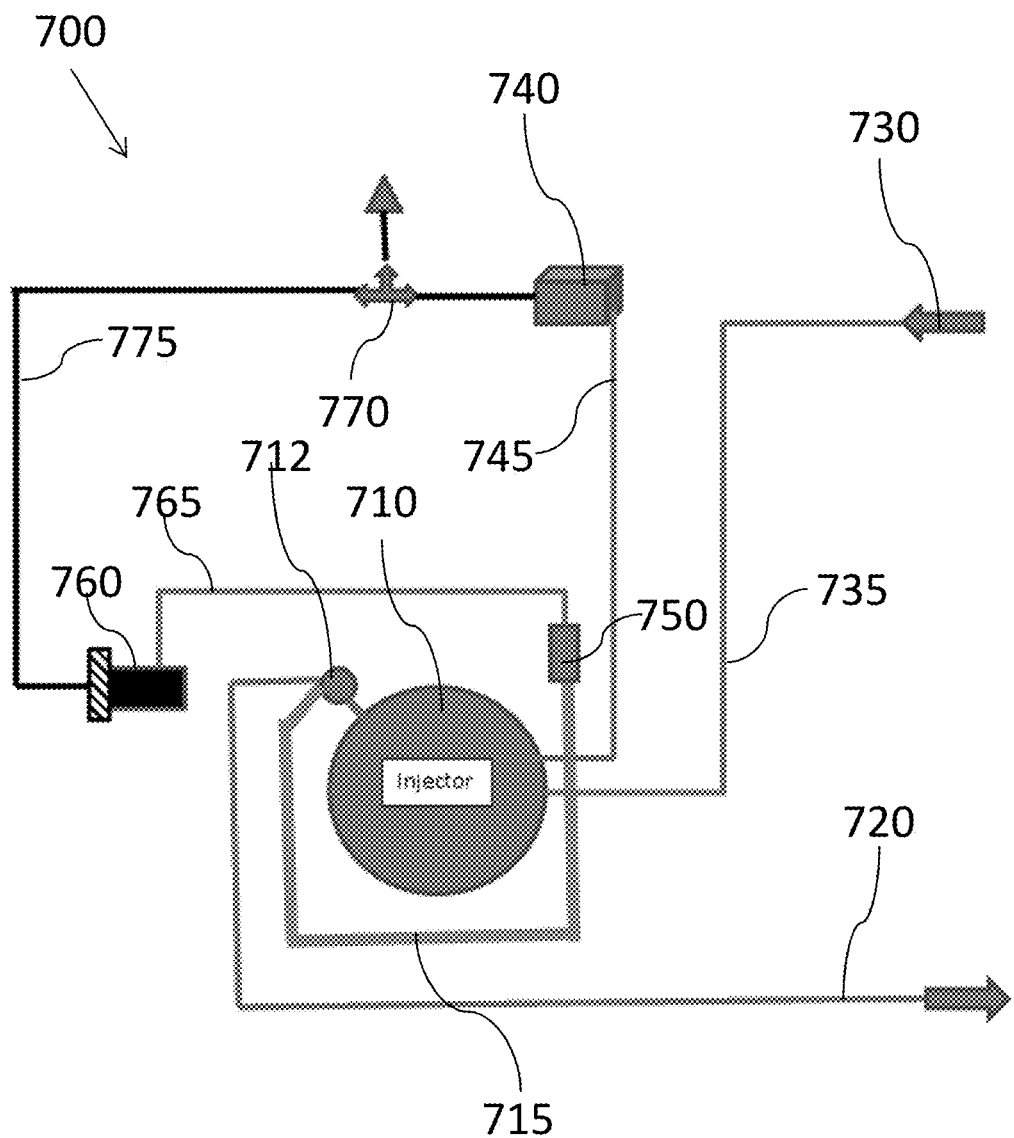
FIG. 7 is a plumbing diagram of a conventional gas chromatography system, in accordance with certain examples.

For reference purposes, a plumbing diagram of a conventional Clarus GC instrument commercially available from PerkinElmer Health Sciences, Inc. (Waltham, Mass.) is shown in FIG. 7. The system 700 comprises an injector 710 with a split fitting 712 that is fluidically coupled to a charcoal trap 715 and to a sample fluid line 720. A carrier gas from a PPC module 730 enters the injector 710 through a fluid line 735, e.g., 1/16" stainless steel tubing. The injector 710 is fluidically coupled to a septum purge regulator 740 through a fluid line 745, e.g., 1/16" stainless steel tubing. The charcoal trap 715 coupled to the injector 710 is designed to trap oil in the sample. A union 750 fluidically couples the charcoal trap 715 to a solenoid valve 760 through a fluid line 765, e.g., 1/16" stainless steel tubing. When the solenoid 760 is open, the oil can exit the system through a vent 770 by way of the fluid line 775, e.g., 1/8" PVC tubing.

Figure 8:
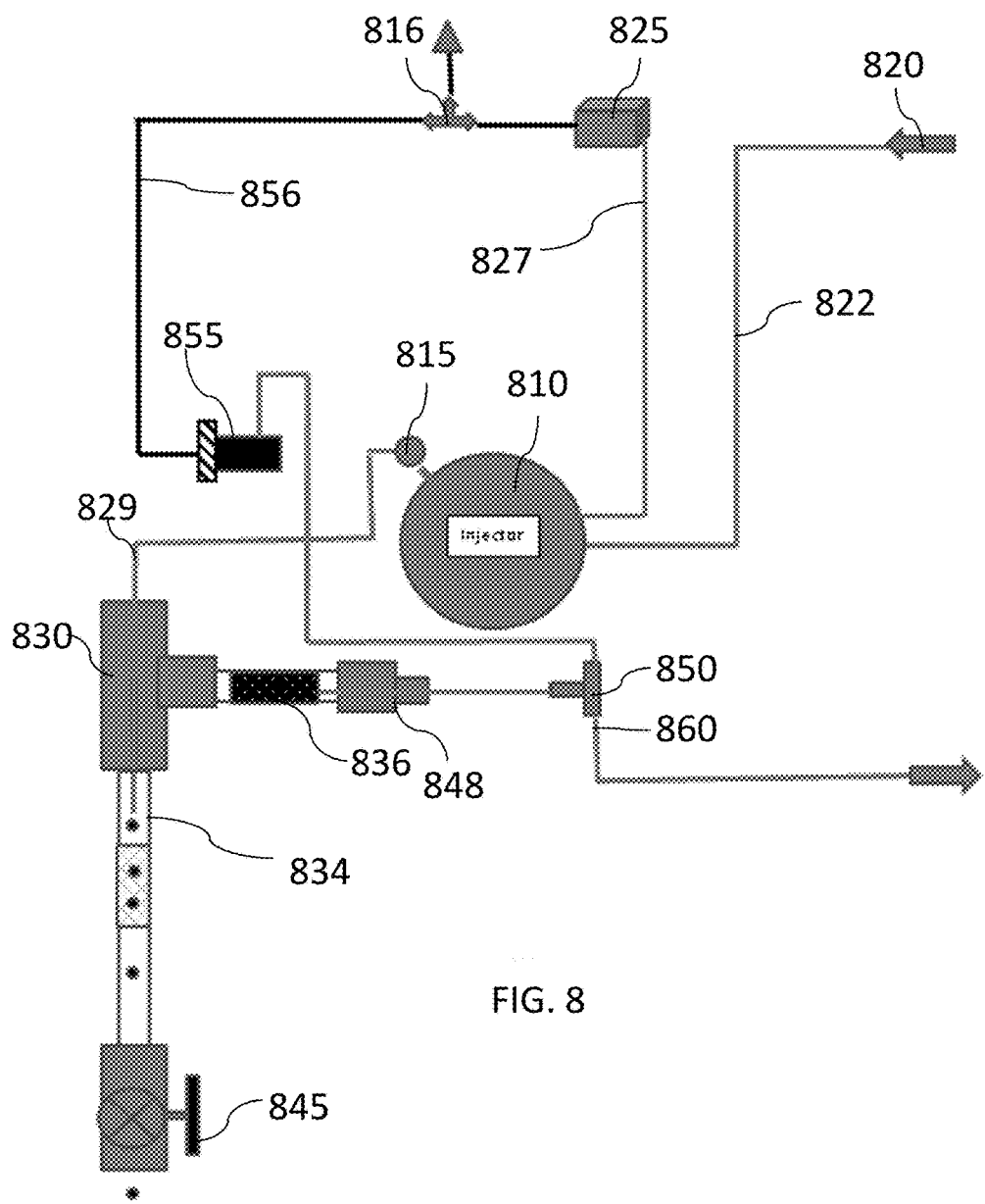
FIG. 8 is a plumbing diagram of a gas chromatography system showing an installed trap, in accordance with certain embodiments.

In comparison, a plumbing diagram of a system comprising a gravity trap is shown in FIG. 8. The system 800 comprises an injector 810 with a split fitting 815. One fitting of the injector 810 may be fluidically coupled to a chromatography column (not shown), and the other fitting can be fluidically coupled to a trap as described herein. A carrier gas from a PPC module 820 enters the injector 810 through a fluid line 822, e.g., 1/16" stainless steel tubing. The injector 810 is fluidically coupled to a septum purge regulator 825 through a fluid line 827, e.g., 1/16" stainless steel tubing. The injector 810 is fluidically coupled to a coupler or ferrule 830 of the gravity trap through a fluid line 829. The ferrule 830 is configured to split or bifurcate the flow to a trap fluid line 834 and to a second fluid line 836. The trap fluid line 834 can receive and condense oil in the sample. The second fluid line 836 is fluidically coupled to a tee 850 through a union 848. The fluid line 836 may optionally comprise wool or other material to prevent any oil in the sample to pass downstream of the fluid line 836. The tee 850 is also fluidically coupled to a solenoid valve 855 (which is coupled to the vent 816 through a fluid line 856) and to another fluid line 860, e.g., 1/16" stainless steel tubing, which can fluidically couple the tee 850 to a vent or waste. The tubing that fluidically couples the ferrule 830 to the injector may be 1/16" stainless steel tubing. A 1/4" nut may couple the tubing to the ferrule 830. The ferrule 830 can be configured as a reducing ferrule. As shown in FIG. 8, the fluid line 829 can penetrate into the ferrule 830 so that oil can drop from the end of the fluid line 829 and into the trap fluid line 834. Vaporized analyte that enters into the trap through the fluid line 829 may flow into the fluid line 836 and out of the system. The trap fluid line 834 may comprise a ball valve drain 845 that can be turned to release the collected oil. The second outlet of the injector can be used to provide a portion of the split sample to a chromatography column for separation.

Example 2

Figure 9:
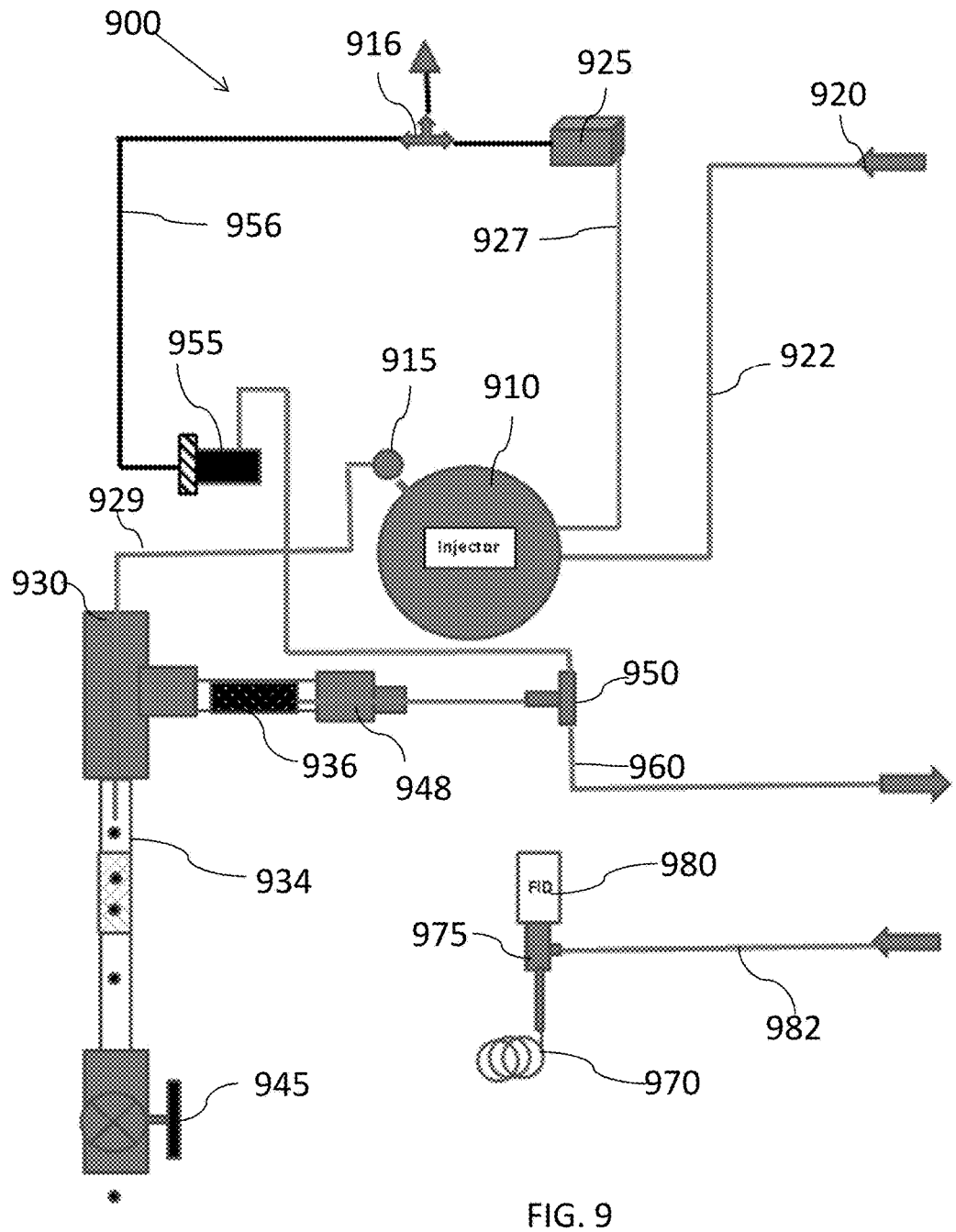
FIG. 9 is another plumbing diagram of a gas chromatography system showing an installed trap, in accordance with certain examples.

FIG. 9 shows another system that comprises a trap. The system 900 comprises an injector 910 with a split fitting 915. One fitting of the injector 910 may go to a chromatography column, and the other fitting can be fluidically coupled to a trap as described herein. A carrier gas from a PPC module 920 enters the injector 910 through a fluid line 922, e.g., 1/16" stainless steel tubing. The injector 910 is fluidically coupled to a septum purge regulator 925 through a fluid line 927, e.g., 1/16" stainless steel tubing. The injector 910 is fluidically coupled to a coupler or ferrule 930 of the gravity trap through a fluid line 929. The ferrule 930 is configured to couple the flow in a trap fluid line 934 and in a second fluid line 936. The trap fluid line 934 is configured to receive oil in the sample. The trap fluid line 934 and/or the ferrule 930 can be positioned external to an instrument housing if desired. The second fluid line 936 is fluidically coupled to a tee 950 through a union 948. The fluid line 936 may optionally comprise wool or other materials to prevent any oil in the sample to pass downstream of the fluid line 936. The tee 950 is also fluidically coupled to a solenoid valve 955 (which is coupled to the vent 916 through a fluid line 956) and to another fluid line 960, e.g., 1/16" stainless steel tubing, which can fluidically couple the tee 950 to a fluid line. The tubing that fluidically couples the ferrule 930 to the injector may be 1/16" stainless steel tubing. A 1/4" nut may couple the tubing to the ferrule 930. The ferrule 930 can be configured as a reducing ferrule. As shown in FIG. 9, the fluid line 929 can penetrate into the ferrule 930 so that oil can drip from the end of the fluid line 929 and into the trap fluid line 934. The trap fluid line 934 may comprise a ball valve drain 945 that can be turned to release the collected oil. Vaporized analyte that enters the trap 930 can flow to waste through the fluid line 936, tee 950 and valve 955. A column 970, which is fluidically coupled to the other fluid line of the split flow injector, can separate the contaminants in the sample and provide them to a detector 980, e.g., an FID. A prevent adaptor 975 can be present and fluidically coupled to a pressure source (not shown) through a fluid line 982 to permit forward flow or to provide for backflow through the system 900.

Example 3

Figure 10:
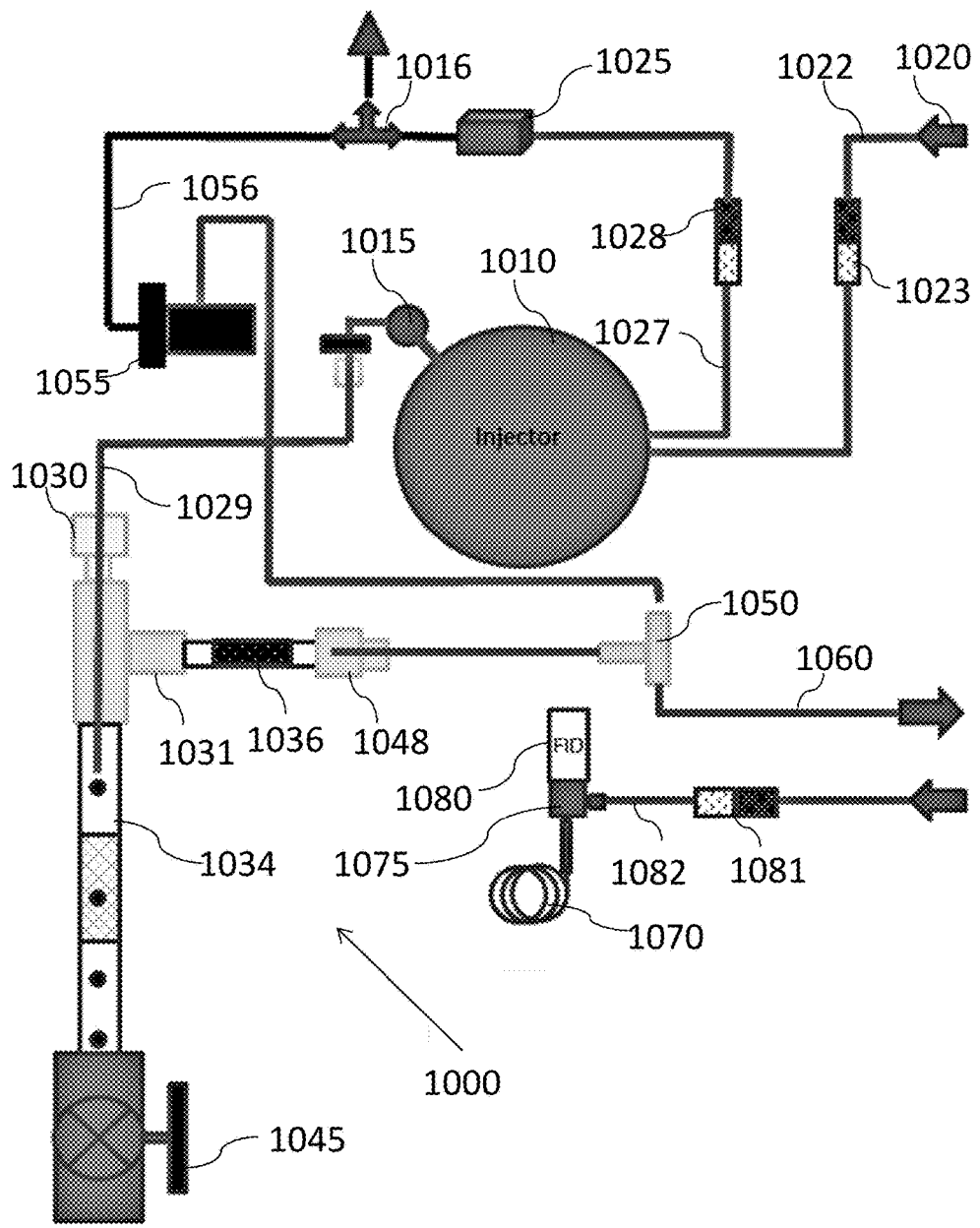
FIG. 10 is another plumbing diagram of a gas chromatography system showing an installed trap, in accordance with certain embodiments.

FIG. 10 shows another system that can be used to analyze contaminants in a fluid sample such as an oil sample. The system 1000 comprises an injector 1010 with a split fitting 1015. One fluid line coupled to the injector 1010 may go to a column, and another fluid line can be fluidically coupled to a trap as described herein. A carrier gas from a PPC module 1020 enters the injector 1010 through a fluid line 1022, e.g., 1/16" stainless steel tubing. Wool or other material 1023 can be present in the fluid line 1022. The injector 1010 is fluidically coupled to a septum purge regulator 1025 through a fluid line 1027, e.g., 1/16" stainless steel tubing. Wool or other material 1028 can be present in the fluid line 1027. The injector 1010 is fluidically coupled to a ferrule 1030 and a first tee 1031 (e.g., comprising a 1/8"-1/16" reducing ferrule and a 1/4" tee) of the gravity trap through a fluid line 1029, e.g., 1/16" stainless steel tubing. The first tee 1031 is configured to couple the flow in a trap fluid line 1034, e.g., 1/8" polypropylene tubing, and in a second fluid line 1036, e.g., 1/4" PVC tubing. The first fluid line 1034 is fluidically coupled to a fluid reservoir 1040 of the trap to receive liquid oil. The trap fluid line 1034 and/or the ferrule 1030 and tee 1031 can be positioned external to an instrument housing if desired. The second fluid line 1036 is fluidically coupled to a tee 1050, e.g., a 1/16" tee, through a union 1048, e.g., a 1/4"-1/16" reducing union. The fluid line 1036 may optionally comprise wool or other materials to prevent any oil in the sample to pass downstream of the fluid line 1036. The tee 1050 is also fluidically coupled to a solenoid valve 1055 (which is coupled to the vent 1016 through a fluid line 1056, e.g., 1/16" PVC tubing) and to another fluid line 1060, e.g., 1/16" stainless steel tubing, which can fluidically couple the tee 1050 to a chromatography column 1070. The tubing that fluidically couples the ferrule 1030 to the injector may be 1/16" stainless steel tubing. A 1/4" nut may couple the fluid line 1029 to the ferrule 1030. As shown in FIG. 10, the fluid line 1029 can penetrate into the ferrule/tee assembly 1030 so that oil can drip from the end of the fluid line 1029 and into the trap fluid line 1034. The trap fluid line 1034 may comprise a ball valve drain 1045 that can be turned to release the collected oil. Vaporized analyte that enters the trap 1030 can flow to waste through the fluid line 1036, the tee 1050 and the valve 1055. The column 1070, which is fluidically coupled to the other fluid line of the split flow injector, can separate the contaminants in the sample and provide them to a detector 1080, e.g., an FID. A prevent adaptor 1075 can be present and fluidically coupled to a pressure source (not shown) through a fluid line 1082, which may comprise wool or other material 1081, to permit forward flow or to provide for backflow through the system 1000. The fluid line 1082 may be sized, for example, as 1/16" or 1/32" stainless steel tubing.

Example 4

To retrofit an existing GC instrument with the current trap, swage lock fittings and tubing can be used to couple the trap to the other components. The illustration in this example refers to retrofitting a Clarus GC with the trap. Similar steps can be performed using other gas chromatography systems.

The existing charcoal trap connected to the injector is located. The injector may either be a capillary (CAP) injector or a Programmable Split Splitless (PSS) injector. The steel tubing from the charcoal trap connected directly to the solenoid is disconnected by unscrewing the 1/16" nut from the union. The steel tubing line from the head pressure bulk heading fitting in the back of the GC is detached. The nut and ferrule used to connect this tube for the installation of the trap are set aside for reuse. The tubing is released from any clips or ties used to hold down tubing so that it can be removed with the charcoal trap. The last connection that is removed from the charcoal trap is the nut directly connecting the charcoal trap to the injector. The charcoal trap is then removed from the GC and set aside (it is not reused).

To attach the new trap (which comprises a ferrule coupled to a fluid reservoir as noted in connection with Example 3), the injector septa nut and collar from the injector are removed to provide clearance to the connection of the nut directly to the injector. About 14 inches of tubing is used on the trap and connected to the port directly on the injector. After the tubing is connected, the injector collar and septa nut can be reattached to the injector. The existing tubing from the solenoid is connected to the available nut on the 1/16" tee. About 30 inches of tubing is used and uncoiled. This tubing is routed through clips or ties to retain it. The tubing is connected with the nut and ferrule that was put aside to the head pressure bulk head fitting. Once everything is securely fastened and tightened, any loose tubing is forced from the installation away from the autosampler to avoid it getting caught while operating. The GC lid is closed and the trap loosely hangs outside of the instrument. The system is checked for any leaks from the installation before performing any injections.

When introducing elements of the aspects, embodiments and examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A gas chromatography system comprising:
an injector comprising an inlet port fluidically coupled to an outlet of the injector which is fluidically coupled to a common fluid line at the outlet of the injector, wherein the common fluid line splits into a first fluid line and a second fluid line, in which the injector is configured to receive a fluid sample comprising an oil and analyte of interest through the inlet port, vaporize the received fluid sample and provide the vaporized fluid sample through the common fluid line and the first and second fluid lines;
a trap fluidically coupled to the first fluid line, the trap configured to receive vaporized oil in the vaporized fluid sample from the first fluid line and trap and condense the vaporized oil in the fluid sample in the trap while permitting continued flow of vaporized analyte of interest to waste;
a gas chromatography column fluidically coupled to the second fluid line and configured to receive the vaporized fluid sample through the second fluid line to separate analytes in the received vaporized fluid sample;
a detector fluidically coupled to the gas chromatography column and configured to receive the separated analytes from the gas chromatography column and detect the separated analytes,
in which the trap is positioned outside of an instrument housing comprising the gas chromatography column, and the common fluid line travels from an internal space of the instrument housing to the outside of the instrument housing where the trap is positioned, and wherein the first fluid line penetrates into the trap to permit dripping of vaporized oil from the first fluid line into the trap as condensed oil.

2. The gas chromatography system of claim 1, in which the trap is configured as a gravity trap constructed and arranged to receive the vaporized oil in the vaporized fluid sample, condense the vaporized oil and retain the condensed oil in the trap.

3. The gas chromatography system of claim 2, in which the common fluid line comprises a split fitting fluidically coupled to the first fluid line and the second fluid line.

4. The gas chromatography system of claim 1, in which a terminal portion of the first fluid line that penetrates into the trap is positioned at a lower height than a height of the inlet port of the injector.

5. The gas chromatography system of claim 1, in which the trap further comprises a drain valve configured to permit removal of the condensed oil from the trap.

6. The gas chromatography system of claim 1, further comprising an oven that receives the gas chromatography column.

7. The gas chromatography system of claim 1, further comprising at least one flow controller fluidically coupled to the injector.

8. The gas chromatography system of claim 7, further comprising a processor electrically coupled to the at least one flow controller.

9. The gas chromatography system of claim 1, in which the trap comprises at least one material effective to absorb the condensed oil.

10. The gas chromatography system of claim 1, in which the trap comprises a larger inner diameter than an outer diameter of the first fluid line.

11. The gas chromatography system of claim 1, in which the detector is selected from the group consisting of a mass spectrometer, a thermal conductivity detector, a flame ionization detector, a flame photometric detector, a photoionization detector, an infrared detector, a catalytic combustion detector, a discharge ionization detector, an electron capture detector, a thermionic detector and a nitrogen-phosphorous detector.

12. A gas chromatography system comprising:
an injector comprising an inlet port fluidically coupled to an outlet of the injector which is fluidically coupled to a common fluid line at the outlet of the injector, wherein the common fluid line splits into a first fluid line and a second fluid line, in which the injector is configured to receive a fluid sample comprising an oil and analyte of interest through the inlet port, vaporize the received fluid sample and provide the vaporized fluid sample through the common fluid line and the first and second fluid lines;
a trap fluidically coupled to the first fluid line, the trap configured to receive vaporized oil in the vaporized fluid sample from the first fluid line and trap and condense the vaporized oil in the fluid sample in the trap while permitting continued flow of vaporized analyte of interest to waste;
a gas chromatography column fluidically coupled to the second fluid line and configured to receive the vaporized fluid sample through the second fluid line to separate analytes in the received vaporized fluid sample;
a detector fluidically coupled to the gas chromatography column and configured to receive the separated analytes from the gas chromatography column and detect the separated analytes, and
in which a first section of the common fluid line is positioned within an instrument housing comprising the gas chromatography column and a second section of the common fluid line is positioned outside of the instrument housing comprising the gas chromatography column.

13. The gas chromatography system of claim 12, further comprising a flow controller configured to control the flow of carrier gas in the gas chromatography system.

14. The gas chromatography system of claim 13, further comprising a processor electrically coupled to the flow controller.

15. The gas chromatography system of claim 14, in which the trap comprises at least one material effective to absorb the condensed oil.

16. The gas chromatography system of claim 14, in which the trap comprises a larger inner diameter than an outer diameter of the first fluid line.

17. The gas chromatography system of claim 14, in which the detector is selected from the group consisting of a mass spectrometer, a thermal conductivity detector, a flame ionization detector, a flame photometric detector, a photoionization detector, an infrared detector, a catalytic combustion detector, a discharge ionization detector, an electron capture detector, a thermionic detector and a nitrogen-phosphorous detector.

* * * * *